Feb. 9, 1965  K. EICHHOLTZ  3,168,998
COMPOSITE JET ENGINE FOR AIRCRAFT HAVING
A LARGE RANGE OF SPEED
Filed July 26, 1962
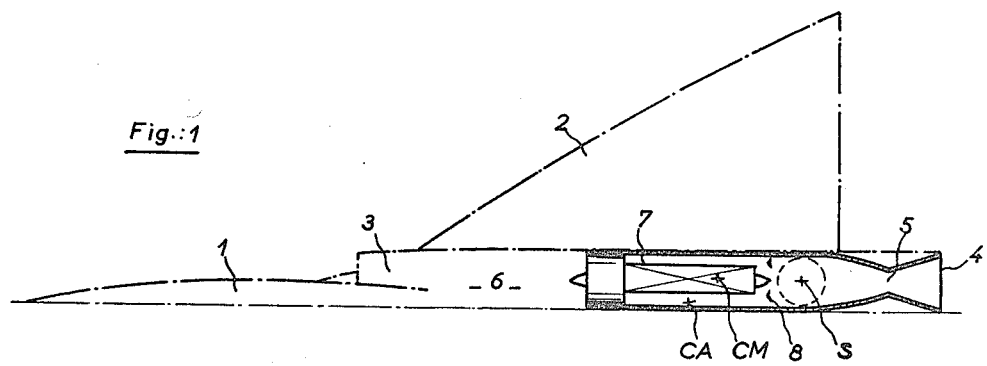
Fig.:1
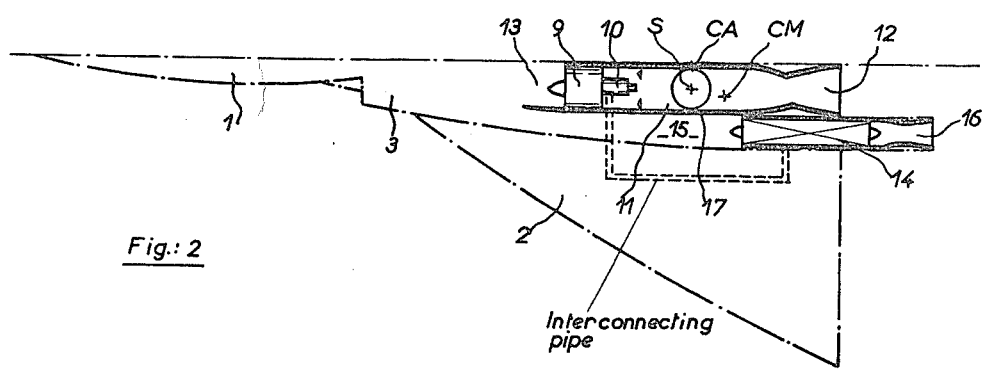
Fig.: 2
Interconnecting pipe
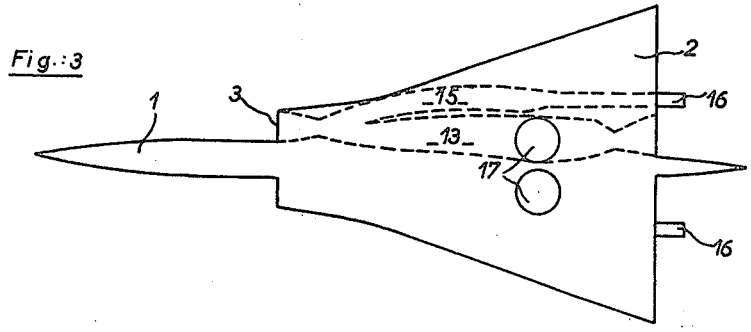
Fig.:3
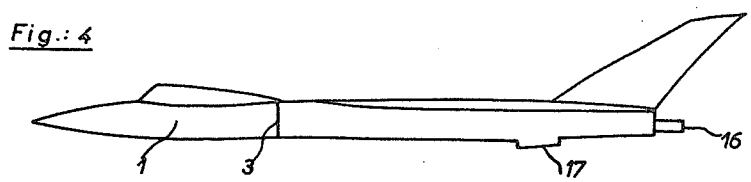
Fig.: 4
INVENTOR
Konrad Eichholtz
By Watson, Cole, Grindle & Watson
ATTORNEYS United States Patent Office 3,168,998
Patented Feb. 9, 1965

3,168,998
COMPOSITE JET ENGINE FOR AIRCRAFT HAVING A LARGE RANGE OF SPEED
Konrad Eichholtz, Dammarie-les-Lys, France, assignor to Societe Nationale d'Etude et de Construction de Moteurs d'Aviation, Paris, France, a company of France
Filed July 26, 1962, Ser. No. 212,663
Claims priority, application France, Aug. 4, 1961, 870,095
3 Claims. (Cl. 244—23)

In my copending patent application Ser. No. 152,897 filed on November 16, 1961, is described a composite jet engine comprising at least two jet propulsion channels terminating in separate discharge nozzles, one of said channels contains a gas generator supplying motive gas both to the corresponding disscharge nozzle for producing thrust and to the turbine of a turbo-compressor producing compressed air and the other—referred to as the "power duct"—a low-pressure compressor or fan driven wholly or partly by the compressed air supplied by said turbo-compressor.

In one form of embodiment of a composite engine of this kind, the low-pressure compressor forms part of a turbine-fan assembly mounted in the power duct and having its combustion chamber supplied with the compressed air coming from the duct containing the compressed air generator. The air delivered by the fan and the exhaust gases of the turbine mix with one another, this air having been previously heated, if required, in a chamber formed in the power duct and comprising a re-heating or after-burning device enabling an increased thrust to be obtained. The contribution of the fan to the thrust of the engine is considerable at the time of take-off and at low speeds, and is slightly at supersonic speeds where the compression of the air is effected almost entirely in the intake casing and thrust is due to a large measure to the ram-jet effect.

In order to ensure operation at subsonic and supersonic speeds, the two channels are provided with two adjustable convergent-divergent air inlets or a common adjustable convergent-divergent air inlet, and each channel terminates in an individual adjustable convergent-divergent discharge nozzle.

The present invention relates to an aircraft having a large speed range, which is designed for short-run or vertical take-off and landing, and is provided with one or more composite engines according to the above-mentioner patent application, adapted to provide, by themselves, the propulsion force and also the lifting force for the aircraft, lifting force being achieved by means of at least one special discharge nozzle which is directed downwardly and is supplied by all or part of the flow of the power duct by taking the said flow from or deflecting it at an intermediate point on the said duct.

The special lifting discharge nozzle or nozzles are placed in such a manner that the lifting thrust directed upwardly (or the resultant of the lifting thrusts) passes through the centre of gravity of the aircraft or in the immediate vicinity thereof, in order to avoid creating unbalancing moments which otherwise would have to be compensated for. For this purpose, the fan, the heating device and also the re-heating chamber which follows it are situated towards the front of the aircraft relatively to its centre of gravity.

In the case of aircraft such as modern fighter aircraft where the weight is mainly concentrated towards the front, the compressed air generator will be arranged towards the rear of the centre of gravity of the aircraft. Of course, for aircraft of different type where the weight is distributed rather towards the rear, it would be possible to arrange the compressed air generator in a more advanced position.

The composite engine of the main above-mentioned patent application lends itself particularly well to such arrangement, taking into account the prescribed location of the lifting nozzle or nozzles in the vicinity of the centre of gravity of the aircraft, by means of the possibility afforded of making the most appropriate choice of position for the other components parts of the engine and more particularly the fan and the compressed air generator. In fact, the existence of separate channels containing these two latter apparatus and the absence of a mechanical power transmission between them eliminate practically all restrictions as to their dispositions relatively to one another. Moreover, the transfer of useful power by pneumatic means from the duct containing the compressed air generator to the duct containing the fan requires only a simple interconnecting conduit which can be given any desired form and length, which affords great flexibility as regards installation as compared with a mechanical power transmission; moveover, such a conduit for compressed air is relatively light and not very bulky.

In a general way, the considerations relating to the longitudinal stability of an aircraft, more particularly a supersonic aircraft, lead to bringing the zone of displacement of its centre of gravity into the vicinity of the zone of displacement of its aerodynamic centre in subsonic and supersonic flight.

Usually, in order to ensure the balance of the aircraft in this way about the transverse axis passing through a given position of its centre of gravity within the limits of the range of displacement of the said centre, the diving moments emanating from the fuselage and its equipment, the masses of which are mainly concentrated forwardly, must be counter-balanced by pitching moments due to placing the engines towards the rear. This is particularly true in the case of fighter aircraft where considerable masses are necessarily placed in a forward position in the fuselage: radar and other equipment carried on board, armaments, pilot's cabin etc.; in this case, the centre of gravity of the engines must be situated rearwardly of the centre of gravity of the aircraft, and this may give rise to a considerable projection of the engines relatively to the trailing edge of the wings.

FIG. 1 shows a plan view of half of a conventional supersonic aircraft;

FIG. 2 shows a plan view of half of a supersonic aircraft arranged according to the present invention;

FIG. 3 is a bottom plan view of the invention shown in FIG. 2; and

FIG. 4 is a side view of the invention shown in FIG. 3.

FIGURE 1 of the accompanying drawings is a half-view in plan of a known twin-engine supersonic aircraft showing very diagrammatically a conventional arrangement. 1 is the fuselage, 2 the delta wing, 3 the air inlet sleeve of a jet engine and 4 the outlet orifice for the gases expanded through a convergent-divergent nozzle 5. In the duct 6 thus formed there is mounted the gas generator 7 of a conventional single-flow or double-flow engine, provided for example with a re-heating device indicated diagrammatically at 8. The centre of gravity of the aircraft is indicated at CA and the centre of gravity of one of the engines at CM.

CM must be rearwardly of the point CA for the reasons explained hereinbefore, which makes a rearward position of the engine necessary and results in the discharge nozzle 5 of the said engine projecting relatively to the trailing edge of the wing 2. Moreover, the re-heating chamber 8 situated at the outlet of the gas generator 7 is considerably offset towards the rear from the centre of gravity CA of the aircraft and if there is connected directly thereto an auxiliary lifting nozzle which is directed downwards (this auxiliary nozzle is represented by a broken-line circle), the axis S of the lifting thrust would be very far from CA, and this would give rise to troublesome longitudinal moments. In other words, the use of engines of conventional design as propulsion and lifting means with a gas generator within the thermodynamic duct, in practice makes it impossible to achieve simultaneously the two conditions already indicated:

On the one hand, bringing the centre of gravity CM of the engine sufficiently rearwardly of the centre of gravity CA of the aircraft to balance the diving moments of the fuselage and its equipment.

On the other hand, connecting to the reheating chamber one or more lifting nozzles so that the resultant of the lifting thrust S will pass near the centre of gravity CA of the aircraft.

In fact, this chamber is situated too far towards the rear and in this case it is necessary to resort, for example, to special lifting-action jet engine units for re-establishing equilibrium when the aircraft is being lifted by jet.

On the contrary, with the arrangement according to the present invention, which is illustrated in a diagrammatic half-view in plan in FIGURE 2 and in views from below and in side section in FIGURES 3 and 4, the two conditions mentioned hereinbefore can be fulfilled without difficulty since the engine is sub-divided into two parts situated in separate channels: on the one hand, the fan 9 driven by a turbine 10 followed by a mixing and reheat chamber 11 and the convergent-divergent discharge nozzle 12, the assembly forming part of the power duct 13, and, on the other hand, the compressed air generator 14 forming part of the second duct 15 which terminates in the adjustable convergent-divergent discharge nozzle 16. It is the power duct 13 which provides the essential thrust (at low speeds by the action of the fan 9, and at high speeds by the performance of a ram-jet cycle within it) whereas the second duct 15 supplies only a low thrust.

As has been indicated hereinbefore, this subdivision into two separate ducts of the composite engine makes it possible to solve in a simple and rational manner the problem of the appropriate distribution of the centres CA, CM and S. First of all, the non-existence of any gas generator in the power duct 13 provides complete freedom of choice for the positioning of the auxiliary lifting nozzle 17, so that the axis S of the thrust which it produces passes in the immediate vicinity of the centre of gravity CA of the aircraft, and the turbo-fan 9, 10 can be placed sufficiently towards the front to provide the necessary space for the reheat chamber 11 upstream of the lifting nozzle 17. On the other hand, in order that the centre of gravity of the engine CM should be to the rear of the centre of gravity of the aircraft CA, it is sufficient to mount the compressed air generator 14 in a sufficiently withdrawn position, which does not present any difficulty.

It should be noted that owing to acoustic phenomena, it may be advantageous to arrange the outlets of the discharge nozzle 12 of the power duct and the discharge nozzle 16 of the compressed air generator substantially in the same transverse plane. For this purpose, the power duct 13 will be extended towards the rear by an appropriate extent and the compressed air generator 14 will be located further forward, so that the aircraft-engine centre of gravity remains unchanged.

What I claim is:

1. In a VTOL or STOL aircraft of the type having at least one downwardly directed lifting nozzle so positioned that the upward lift produced thereby passes through or near the center of gravity of the aircraft, a composite jet engine comprising two distinct jet propulsion channels, a compressed air generator positioned in one of said channels and located in a part of said aircraft extending to the rear of the center of gravity thereof, a turbine-driven fan positioned in the other of said channels and located in a part of said aircraft extending to the front of the center of gravity thereof, and an interconnection conduit extending between said channels for supplying compressed air from said generator to the turbine driving said fan, said lifting nozzle communicating with a part of said other channel downstream of said fan and turbine, whereby said lifting nozzle is fed with at least a portion of the flow provided by said fan and turbine.

2. An aircraft as claimed in claim 1, wherein the weight and relative position of said turbine-driven fan and said compressed air generator are such that the center of gravity of the composite jet engine comprising them is positioned to the rear of the center of gravity of the aircraft.

3. In a VTOL or STOL aircraft of the type having at least one downwardly directed lifting nozzle so positioned that the upward lift produced thereby passes through or near the center of gravity of the aircraft, a composite jet engine comprising two distinct jet propulsion channels, a compressed air generator in one of said channels, a turbine-driven fan in the other of said channels, and an interconnecting conduit extending between said channels for supplying compressed air from said generator to the turbine driving said fan, said lifting nozzle communicating with a part of said other channel downstream of said fan and turbine, whereby said lifting nozzle is fed wtih at least a portion of the flow provided from said fan and turbine, said composite jet engine comprising a combustion chamber within said other channel to the rear of said fan, said combustion chamber and said fan being located in a part of said aircraft extending to the front of the center of gravity thereof, the compressed air generator being located in a part of said aircraft extending to the rear of the center of gravity thereof, the weight and relative position of said turbine-driven fan and said compressed air generator being such that the center of gravity of the composite jet engine comprising them is positioned to the rear of the center of gravity of the aircraft.

References Cited by the Examiner

UNITED STATES PATENTS 2,409,177  10/46  Allen et al. _____ 60—35.68

FOREIGN PATENTS 530,577  9/56  Canada.
1,242,564  8/60  France.

FERGUS, S. MIDDLETON, *Primary Examiner.*

MILTON BUCHLER, *Examiner.*